J. H. STRICKLER.

Improvement in Wrenches.

No. 132,700.  Patented Oct. 29, 1872.

Witnesses:
Henry N. Miller
C. L. Evert

Inventor.
John H. Strickler,
per Alexander Mason,
Attorneys.

UNITED STATES PATENT OFFICE.

JOHN H. STRICKLER, OF BRANDON, OHIO.

IMPROVEMENT IN WRENCHES.

Specification forming part of Letters Patent No. 132,700, dated October 29, 1872.

*To all whom it may concern:*

Be it known that I, J. H. STRICKLER, of Brandon, in the county of Knox and in the State of Ohio, have invented certain new and useful Improvements in Wrench; and do hereby declare that the following is a full, clear, and exact description thereof, reference being had to the accompanying drawing and to the letters of reference marked thereon making a a part of this specification.

The nature of my invention consists in the construction and arrangement of a wrench, which can be adjusted to fit any desired size of nut, and can be used as a monkey-wrench, as will be hereinafter more fully set forth.

In order to enable others skilled in the art to which my invention appertains to make and use the same, I will now proceed to describe its construction and operation, referring to the annexed drawing, in which—

Figure 1:
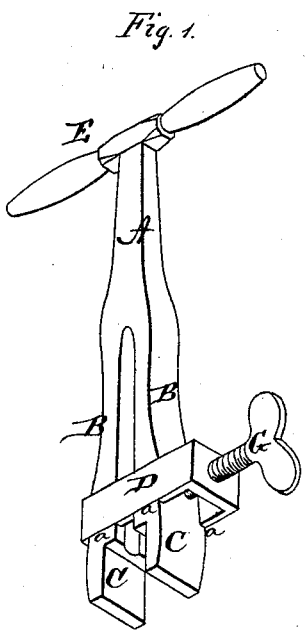
Figure 2:
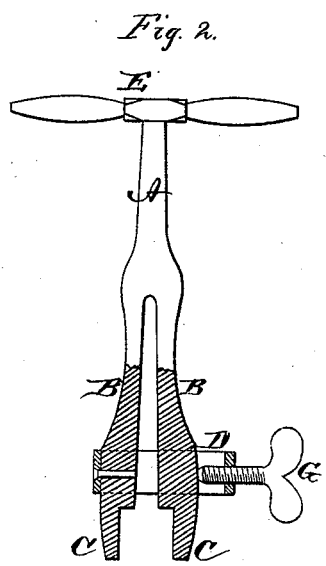

Figure 1 is a perspective view of my wrench, and Fig. 2 is a side view of the same, partly in section.

A represents the stem or shank, with spring-arms B B, upon the outer ends of which are formed jaws C C, surrounded by a band, D, with a set-screw, G, at one end. The shank A may be provided with a handle, E, if so desired.

These parts, constituting my wrench, are constructed in the following manner: Take a piece of square iron—say, for an ordinary wrench ten inches long by three-fourths of an inch thick—to form the shank or stem A. To this are welded the two pieces B B of spring-steel, about six inches long. From the point where they are joined to the shank to the lower edge of the set-screw band D should be about four and one-half inches, and the spring-arms three-fourths of an inch wide. The arms extend below the band about an inch and a half, and this part is an inch and a quarter wide, forming the jaws C C. This makes a shoulder, a, below the band D, projecting one-quarter of an inch, and gives strength to the jaws. For the set-screw band D make a square or rectangular band one inch wide, and of sufficient length to allow the jaws to open one inch and a half. The band is riveted to one of the spring-arms B above the jaw before welding it to the shank. The jaws are adjusted to any size by turning down the thumb-screw G set so as to operate upon the opposite jaw from where the band is riveted. This band may be put on after the jaws are welded, and fastened by a screw or rivet, as well as before; and the whole wrench may be made of steel without any iron.

Having thus fully described my invention, what I claim as new, and desire to secure by Letters Patent, is—

The combination of the shank A, spring-arms B B, jaws C C with shoulders a a, band D, and set-screw G, all constructed and arranged substantially as and for the purposes herein set forth.

In testimony that I claim the foregoing I have hereunto set my hand this 8th day of June, 1872.

JOHN H. STRICKLER.

Witnesses:
 G. B. THRAILKILL,
 J. M. KIRKPATRICK.